United States Patent Office.

CHARLES SACRÉ, OF MANCHESTER, AND STANHOPE PERKINS AND WILLIAM SMELLIE, OF GORTON, KINGDOM OF GREAT BRITAIN.

Letters Patent No. 108,521, dated October 18, 1870.

IMPROVEMENT IN THE MANUFACTURE OF WROUGHT-IRON,

The Schedule referred to in these Letters Patent and making part of the same.

*To all to whom it may concern:*

Be it known that we, CHARLES SACRÉ, of Manchester, in the county of Lancaster, civil engineer, STANHOPE PERKINS, of Gorton, in the said county, engineer, and WILLIAM SMELLIE, of the same place, forge manager, all of the United Kingdom of Great Britain and Ireland, have invented new and useful "Improvements in the Manufacture of Wrought-Iron, or Malleable Metal of Steely Quality;" and we do hereby declare the following to be a full, clear, and exact description of the same.

In manufacturing iron from wrought-iron "scrap," it has hitherto been the practice to "pile" the wrought-iron scrap and heat so as to weld, and then hammer and roll it into bars or plates, as required.

By our invention we make iron more cheaply and of better quality than the best iron usually made from wrought-iron scrap.

Our invention consists in reducing wrought-iron or wrought-iron scrap in a cupola or other melting-furnace, with or without an admixture of pig-iron, steel, or other metal, and in taking the metal thus reduced, while molten, or when cold, to a puddling-furnace to be puddled in the ordinary manner, with or without common pig-iron or other metal, thereby producing a superior wrought-iron or malleable metal of steely quality.

The manner in which we prefer to carry our invention into effect to produce the best quality of wrought-iron, such as will roll direct from the "puddle-bar" into plates, bars, angle iron-rails, or headings for rails for railways, or any other shape, is as follows:

We charge about eleven hundred weights (11 cwts.) of wrought-iron or wrought-iron scrap, together with about ten hundred weights (10 cwts.) of No. 1 pig-iron of commerce, into a cupola or other melting-furnace, and when reduced it is run out and then broken when cold, the produce being about one ton of metal. Then we charge into the puddling-furnace about three hundred and eight pounds (308 lbs.) of the metal produced as above described, one hundred and twelve pounds (112 lbs.) of No. 1 pig-iron of commerce, and twenty-eight pounds (28 lbs.) of the *spiegeleisen* of commerce. This mixture is puddled in the ordinary manner, and produces the best quality of wrought or malleable-iron.

The proportions above-named, as well as the quality of the pig-iron, may be varied, but we prefer the proportions and quality of metal specified.

What we claim as our invention, and desire to secure by Letters Patent, is—

The process of manufacturing wrought-iron or malleable metal by melting wrought or malleable iron scrap, with or without an admixture of pig-iron, in a suitable furnace, and then taking the metal thus reduced, while molten or when cold, to a puddling-furnace to be puddled in the ordinary manner, with or without (but by preference with in each case) the common pig-iron of commerce, substantially as hereinbefore described.

In testimony whereof, we have signed our names to this specification, in the presence of two subscribing witnesses.

CHARLES SACRÉ.
STANHOPE PERKINS.
WILLIAM SMELLIE.

Witnesses:
PETER J. LARSEY,
C. G. DONHOE.